Nov. 17, 1936.  W. HOFLICH  2,061,234
TRAILER COUPLING
Filed Oct. 8, 1935
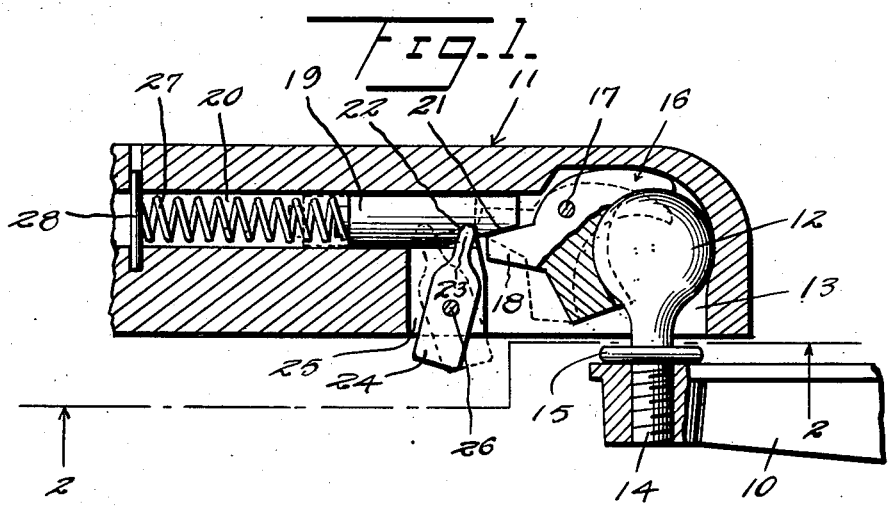
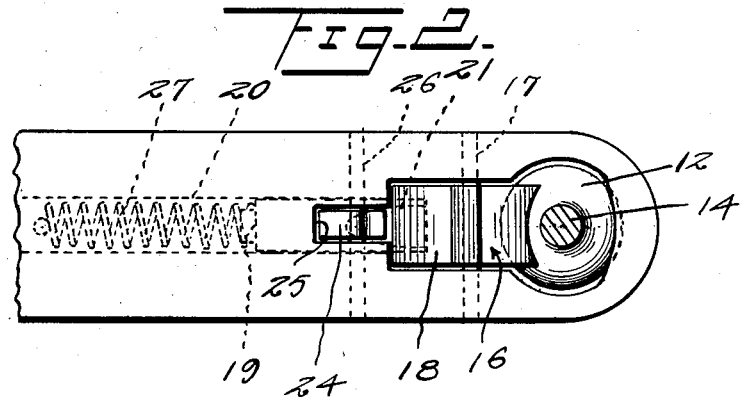
Inventor
Wm. Hoflich
By Watson E. Coleman
Attorney Patented Nov. 17, 1936

2,061,234

UNITED STATES PATENT OFFICE 2,061,234

TRAILER COUPLING

William Hoflich, Albany, Oreg.

Application October 8, 1935, Serial No. 44,113

4 Claims. (Cl. 280—33.15)

This invention relates to coupling devices and more particularly to a trailer hitch by means of which a trailer may be coupled to a tractor body.

The object of this invention is to provide a coupling device by means of which a trailer may be releasably coupled with a vehicle or tractor member the device being so constructed that the trailer will be automatically coupled when engaged with the tractor vehicle.

Another object of this invention is to provide a coupling device by means of which the trailer will be substantially universally coupled with the tractor vehicle so that the trailer may turn with respect to the tractor in both a horizontal direction and in a relatively limited vertical direction.

A still further object of this invention is to provide in a coupling device of this character means to hold the coupling device in a released position and including manually operable means to move the locking means into released position.

The above and various other objects and advantages of this invention will be understood from the following detailed description of the present preferred embodiment, the same being illustrated in the accompanying drawing wherein:—

Figure 1 is a longitudinal section partly broken away and partly in detail of a coupling device constructed according to an embodiment of this invention;

Figure 2 is a sectional view partly in detail taken on the line 2—2 of Figure 1.

Referring to the drawing wherein like numerals of reference designate corresponding parts throughout the several views, the numeral 10 designates generally the frame of a tractor body and is preferably the rear portion of the tractor body or vehicle.

In order to provide a means whereby a trailer of suitable construction may be coupled to the body 10 in a manner to permit substantially universal movement of the trailer with respect to the vehicle 10, I have provided a housing or body generally designated as 11. This body 11 is adapted to be connected to the draw bar or tongue of a trailer and may be connected therewith in any suitable manner (not shown). The body 11 at its forward end is provided with a socket 13 which opens through the under side of the body 11. A ball shaped member 12 having a threaded stem 14 is adapted to releasably engage in the socket 13. The threaded stem 14 of the coupling member 12 is threaded on to the body 10 and is provided with a limiting flange 15 which may be integral with the stem 14.

The coupling pin or member 12 is releasably locked in the socket 13 by means of an arcuate locking member 16 which is rockably mounted on a pin or shaft 17 extending transversely through the body 11. This member 16 has a configuration substantially coincident with the configuration of the pin 12 so that when this locking member 16 is in locked or engaged position the arcuate face of the member 16 will snugly engage the ball shaped member 12.

The locking member 16 at the rear portion is provided with a rearwardly extending arm or lug 18 which is preferably integral with the member 16. This lug 18 constitutes a locking lug to hold the member 16 in locked position or to hold the member 16 in a released position. The locking member 16 is held in either locked or released position by means of a horizontally movable bolt 19 which is slidable in a bore or horizontal passage 20 provided in the body 11. The locking bolt 19 at its forward end is provided with an inclined lug engaging face 21 and is also provided with a recess 22 in which a stem 23 carried by a releasing lever 24 is adapted to engage. The releasing lever 24 is loosely disposed in a slot 25 provided in the body 11 and is mounted for rocking movement on a pin 26 extending across the opening 25 in the body 11. This lever 24 projects below the body 11 so that it can be readily engaged in order to move the locking bolt 19 rearwardly to released position.

An expanding spring 27 is disposed within the bore or passage 20 and one end of the spring 27 engages against the rear end of the locking bolt 19, whereas the other end of the spring 27 engages against a pin 28 extending transversely against the passage 20 and secured in the body 11.

In the use and operation of this coupling device the stationary pin 12 is secured to the desired part of the vehicle frame 10. The body 11 is secured in any desired manner to the draw bar or other portion of the member which it is desired to detachably couple with the tractor frame 10. Initially the locking member 16 is held in released position as shown by dotted lines in Figure 1 by rocking the lever 24 forwardly so as to move the locking bolt 19 rearwardly against the tension of the spring 27. In released position the lug or arm 18 engages against the forward end of the locking bolt 19 as shown in dotted lines in Figure 1. The body 11 is moved to a position overlying the stationary pin 12 and then lowered over this pin 12 which engages within the socket 13 as shown in Figure 1. Downward movement of the body 11 over the pin 12 will cause the locking member 16 to be rocked on the pin or shaft 17 so that the locking arm 18 will be lowered to engage beneath the inclined face 21 of the locking bolt 19 as shown in full lines in Figure 1. In this position the lower end of the released lever 24 is in its rearmost or rearwardly inclined position. The locking bolt 19 will be held in locked position by expansion of the spring 27.

It will, therefore, be apparent that the trailer secured to the body 11 will be detachably connected to the tractor body 10 and that the trailer may have substantially universal swinging movement with respect to the tractor body 10.

The trailer is released from the tractor member by rocking the projecting end of the lever 24 forwardly so as to move the locking bolt 19 rearwardly and release the locking arm 18 carried by the member 16. When the bolt 19 has been moved rearwardly under the action of the lever 24 the body 11 may then be moved vertically off of the pin 12. Vertical movement of the body 11 off of the pin 12 will rock the locking member 16 downwardly and raise the locking arm 18 to a position where the end of this arm 18 will contact with the forward end of the locking bolt 19.

It will be apparent from the foregoing that a relatively simple trailer hitch has been disclosed which will be automatically locked with a coupling pin fixed to a tractor member and which will be held against release until the releasing lever associated with the device is rocked to a released position.

It is, of course, understood that various changes and modifications may be made in the details of construction and design of the above specifically described embodiment of this invention without departing from the spirit thereof, such changes and modifications being restricted only by the scope of the following claims.

I claim:—

1. A coupling device as set forth comprising a body having a downwardly opening socket therein, a headed member engageable in the socket from below, a locking member pivotally mounted in the body, and a spring-pressed member slidable longitudinally of the body and engageable with the locking member to hold the locking member in either locked or released position.

2. A coupling device as set forth comprising a body having a downwardly opening socket therein, a headed member engageable in the socket from below, a pivoted locking member carried by the body and engageable with the headed member to hold the headed member in locked position, a locking arm fixedly carried by the locking member within the body, and a spring pressed member slidable in the body and engageable with said locking arm to hold the locking member in either locked or released position.

3. A coupling device as set forth comprising a body having a downwardly opening socket therein, a headed member engageable in the socket from below, a locking member pivotally carried by the body and engageable with the headed member to lock the headed member in the socket, a locking arm fixed to the locking member, a locking bolt slidable longitudinally of the body and engageable with the locking member to hold the locking member in either locked or released position, and a lever pivotally carried by the body and engageable with the locking bolt to move the bolt to released position.

4. A coupling device as set forth comprising a body having a downwardly opening socket therein, a headed member engageable in the socket from below and adapted to be secured to a tractor body, a locking member pivotally mounted in the body and swingable into the socket to hold the headed member in the socket, a locking arm fixed to the locking member, a locking bolt slidable in the body and engageable with the locking arm to hold the locking arm in either locked or released position, a spring constantly urging said locking bolt to a position engaging said locking arm, and means carried by the body engageable with the locking bolt and projecting outwardly of the body to effect manual movement of the locking bolt to released position.

WILLIAM HOFLICH.